United States Patent
Siu et al.

(10) Patent No.: US 12,524,529 B1
(45) Date of Patent: Jan. 13, 2026

(54) DEVICES, SYSTEMS, AND METHODS FOR USING LINGUISTIC APPROACHES TO UNDERSTAND MALICIOUS PROGRAMS

(71) Applicant: Oceanit Laboratories, Inc., Honolulu, HI (US)

(72) Inventors: David Siu, Honolulu, HI (US); James Ray Nowell, Waialua, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 239 days.

(21) Appl. No.: 18/242,748

(22) Filed: Sep. 6, 2023

Related U.S. Application Data

(60) Provisional application No. 63/404,086, filed on Sep. 6, 2022.

(51) Int. Cl.
*G06F 21/55* (2013.01)
*G06F 8/41* (2018.01)

(52) U.S. Cl.
CPC .............. *G06F 21/552* (2013.01); *G06F 8/41* (2013.01); *G06F 2221/034* (2013.01)

(58) Field of Classification Search
CPC ..... G06F 21/552; G06F 8/41; G06F 2221/034
See application file for complete search history.

(56) References Cited

U.S. PATENT DOCUMENTS

| | | | |
|---|---|---|---|
| 9,900,324 B1* | 2/2018 | Barua | H04L 63/1408 |
| 2013/0326625 A1* | 12/2013 | Anderson | G06F 21/566 726/23 |
| 2017/0337372 A1* | 11/2017 | Zhang | G06F 21/53 |
| 2019/0095616 A1* | 3/2019 | Drapeau | G06F 21/566 |
| 2024/0056458 A1* | 2/2024 | Lee | G06F 40/58 |
| 2024/0320338 A1* | 9/2024 | Chhetri | G06N 3/0464 |

* cited by examiner

*Primary Examiner* — Linglan Edwards
*Assistant Examiner* — Kamryn J Gillespie
(74) *Attorney, Agent, or Firm* — Fresh IP PLC; Clifford D. Hyra; Aubrey Y. Chen

(57) ABSTRACT

Disclosed herein are devices, systems, and methods for detecting, understanding, and classifying malicious actions and/or behaviors in software (e.g., malware), including hidden malicious actions. Specifically, disclosed embodiments use natural language approaches to understand malicious software and provide explanations for classification results. At least one embodiment constructs a knowledge graph that includes textual explanations from source materials (e.g., articles), collecting one or more sets of dynamic program traces from one or more instances of malware, and constructing and training a model (also referred to herein as Trace-BERT) using the one or more sets of dynamic program traces. Forced execution of sample segments of computer code can also be used to identify hidden or novel malicious actions.

19 Claims, 15 Drawing Sheets

```
----[ 1.3 - Jprobe example
In this paper we will be working primarily with jprobes and kretprobes. As shown in
the kprobe documentation already, there are several functions available for
registering and unregistering these probes.

Lets pretend for a moment that we are interested in sys_mprotect, and we want to
inspect any calls to it, and the args that are being passed. For this we could
register a jprobe for sys_mprotect. The following code outlines the general idea
here. And consider that because we are setting a jprobe on a syscall, we need to
either declare our jprobe handler using 'asmlinkage' magic, otherwise we must get
our args directly from the registers. In our example I will get the args directly
from the registers just to show how to obtain the registers for the current task.

int n_sys_mprotect(unsigned long start, size_t len, long prot){
        struct pt_regs *regs = task_pt_regs(current);

start = regs->bx;
        len = regs->cx;
        prot = regs->dx;

printk("start: 0x%lx len: %u prot: 0x%lx\n", start, len, prot);
        jprobe_return();
        return 0;
}
/*      The following entry in struct jprobe is 'void *entry'
        and simply points to the jprobe function handler that will
        be executing when the probe is hit on the function entry
        point. */
static struct jprobe mprotect_jprobe = {
        .entry = (kprobe_opcode_t *)n_sys_mprotect, // function entry
};
static int __init jprobe_init(void){
        /* kp.addr is kprobe_opcode_t *addr; from struct kprobe and */
        /* points to the probe point where the trap will occur. In */
        /* our case we are probing sys_mprotect */
        mprotect_jprobe.kp.addr=(kprobe_opcode_t*)kallsyms_lookup_name("sys_mprotect"
);
        if ((ret = register_jprobe(&mprotect_jprobe)) < 0)   {
                printk("register_jprobe failed for sys_mprotect\n");
                return -1;
        }
        return 0;
}
In the above code, we register a jprobe for sys_mprotect. This means that a
breakpoint instruction is placed on the entry point of the function and as soon as
it gets called a trap occurs and control is passed to our n_sys_mprotect() jprobe
handler. From this point we can analyze data such as the arguments passed either in
registers or on the stack, as well as any kernel data structures. We can also
modify kernel data structures, which is primarily what we rely on for our patches
using kprobes. Any attempts to modify the stack arguments or registers will be
overriden as soon as our handler function returns -- this is because kprobes saves
the register state and stack args prior to calling the handler, and restores these
values upon the jprobe_return(), at which point the real syscall or function will
execute and do its thing.
```

FIG. 3

| | id | subj | subj_label | subj_kmeans | verb | obj | obj_label | obj_kmeans |
|---|---|---|---|---|---|---|---|---|
| 502 | 2 2 | | the kernel | 10 | 48 | patch | the efficient way | 20 | 84 |
| 504 | 10 10 | | the kernels integrity | -1 | 48 | subvert | other interesting patches | 1 | 9 |
| 506 | 11 11 | | the kernels integrity | -1 | 48 | harden | other interesting patches | 1 | 9 |
| 508 | 12 12 | | the kernels integrity | -1 | 48 | harden | other interesting patches | 1 | 9 |
| 510 | 22 22 | | the kernel | 10 | 48 | instrument | this kprobes interface | 16 | 17 |
| 512 | 33 33 | | the kernel | 10 | 48 | patch | kprobes | 16 | 17 |
| 514 | 36 36 | | the behavior of the kernel | 10 | 48 | modify | kprobes | 16 | 17 |
| 516 | 217 217 | | kernel / kprobes.c | 10 | 48 | study | the reader | 19 | 14 |
| 518 | 229 229 | | kernels | 10 | 48 | enable | the w^x feature | -1 | 29 |
| 520 | 251 251 | | the kernel | 10 | 48 | instrument | the kprobe interface , | 16 | 17 |
| 522 | 254 254 | | the kernel | 10 | 48 | weaken | several examples of | -1 | 52 |
| 524 | 261 261 | | kernel code | 10 | 48 | debug | kprobes | 16 | 17 |
| 526 | 262 262 | | kernel code | 10 | 48 | debug | people | -1 | 28 |
| 528 | 263 263 | | the kernel | 10 | 48 | harden | simple patches for | 1 | 9 |
| 530 | 264 264 | | the kernel | 10 | 48 | harden | so patches | 1 | 9 |

FIG. 5

```
800
                                                           802
START_BLOCK
syscall, 0, 1528, 0xb9eac3c0, 0x40157b, malware.exe, 1, malware.exe, |_fopen,| 0    804
END_BLOCK
START_BLOCK
syscall, 0, 1528, 0xb9eac3c0, 0x828683ce, malware.exe, 1, ntoskrnl.exe, |NtCreateFile,| 11,
    FileHandle, -, DesiredAccess, 0xc0100080, ObjectAttributes, 0x22fbd4, IoStatusBlock, -,
    AllocationSize, 0x0, FileAttributes, 0x80, ShareAccess, 0x3, CreateDisposition, 0x3,
    CreateOptions, 0x60, EaBuffer, 0x0, EaLength, 0x0                      806
IN DesiredAccess     {"ACCESS_MASK": "0xc0100080"}
IN ObjectAttributes  {"Length": 24, "RootDirectory": "0x0", "ObjectName": {"Length": 37,
    "MaximumLength": 74, "Buffer": "\??\|C:\\Users\\nome\\Desktop\\keylog1.txt"|},
    "Attributes": 66, "SecurityDescriptor": 0, "SecurityQualityOfService": 2292732}
IN FileAttributes    {"ULONG": "0x80"}
IN ShareAccess       {"ULONG": "0x3"}
IN CreateDisposition {"ULONG": "0x3"}
IN CreateOptions     {"ULONG": "0x60"}
IN EaLength          {"ULONG": "0x0"}                                    808
END_BLOCK
START_BLOCK
syscall, 0, 1528, 0xb9eac3c0, 0x82650db6, malware.exe, 1, ntoskrnl.exe, |NtCreateFile_Return,|
    ReturnValue, 0x0
OUT FileHandle       {"FHandle": "0x50"}
END_BLOCK          810
START_BLOCK
syscall, 0, 1528, 0xb9eac3c0, 0x8286f65b, malware.exe, 1, ntoskrnl.exe,
    |NtQueryVolumeInformationFile,| 5, FileHandle, \\Users\nome\Desktop\keylog1.txt,
    IoStatusBlock, -, FsInformation, -, Length, 0x8, FsInformationClass, 0x4
IN FileHandle        {"HANDLE": "0x50"}
IN Length            {"ULONG": "0x8"}
END_BLOCK          812
START_BLOCK
syscall, 0, 1528, 0xb9eac3c0, 0x82650db6, malware.exe, 1, ntoskrnl.exe,
    |NtQueryVolumeInformationFile_Return,| ReturnValue, 0x0
END_BLOCK          814
START_BLOCK
syscall, 0, 1528, 0xb9eac3c0, 0x8286ea68, malware.exe, 1, ntoskrnl.exe,
    |NtQueryInformationFile,| 5, FileHandle, \\Users\nome\Desktop\keylog1.txt, IoStatusBlock, -,
    FileInformation, -, Length, 0x18, FileInformationClass, 0x5
```

```
fopen(C:\Users\nome\Desktop\keylog1.txt),
   NtAllocateVirtualMemory,
   NtAllocateVirtualMemory_Return,
   NtQueryInformationFile,
   NtQueryInformationFile_Return,
   NtSetInformationFile,
   NtSetInformationFile_Return,
fopen_Return
```

FIG. 9

DEVICES, SYSTEMS, AND METHODS FOR USING LINGUISTIC APPROACHES TO UNDERSTAND MALICIOUS PROGRAMS

CROSS-REFERENCE TO RELATED APPLICATION

This application claims the benefit of U.S. Provisional Patent Application No. 63/404,086, filed Sep. 6, 2022, which is hereby incorporated by reference in its entirety.

STATEMENT REGARDING FEDERALLY SPONSORED RESEARCH OR DEVELOPMENT

The invention described herein was made with U.S. government ("Government") support under Contract No. W911NF-21-C-0009, awarded by the U.S. Army. As a result, the Government has certain rights in this invention.

FIELD

The disclosure relates generally to devices, systems, and methods for understanding malicious software, including, for instance, ransomware and malware. In particular, embodiments of the disclosure review, understand, and classify malicious software, including novel malicious software, so that it can be detected and/or blocked in the future.

BACKGROUND

By some estimates, the worldwide cybersecurity market was valued at $167 billion in 2020 and is expected to grow roughly 11% from 2021 to 2028. For instance, the U.S. Department of Defense cybersecurity budget was $6.7 billion in 2017, and is expected to almost triple to $18 billion by 2022. Cybersecurity spending in the oil and gas industries was expected to hit almost $2 billion by 2019.

Cybersecurity is also currently one of the highest-growth markets due to high-profile, large-scale attacks against leading companies, which need to protect their intellectual property. Moreover, cybersecurity is unique since almost all industries (e.g., healthcare, retail, entertainment, transportation, governments, militaries, etc.) require improved software and services, since existing products can be difficult to use and often do not protect against rapidly-evolving threats.

As a result, high demand for information security systems is expected to continue across a variety of industries and organizations, including, for instance, government agencies, military agencies, and private sector companies, due to enhanced threats from hackers, nation states, and criminals with increased access to automated tools and services.

Indeed, the number of stealthy, targeted, financially-motivated attacks is increasing. Many such attacks are aimed at exploiting vulnerabilities in endpoint devices. As a result, many companies and industries have an increasing awareness, and need, for a multi-layered seamless approach for protecting against malicious software. Signature-based antivirus and anti-spyware protection measures, which are traditionally provided by antivirus software, are not sufficient to deal with the current stream of constantly evolving cyberthreats, including novel malware.

Given the foregoing, there exists a significant need for devices, systems, and methods that can recognize, understand, and classify malicious actions, such as those executed by malicious software (e.g., malware or ransomware). In particular, there is a need for cybersecurity solutions that use natural language approaches to understand malicious software and provide explanations for classification results.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Embodiments of the present disclosure are directed towards devices, systems, and methods for understanding and classifying actions of malicious software. Specifically disclosed herein are methods, devices, and/or systems that explain the actions of unknown and/or novel malicious software by providing natural language descriptions of the dynamic execution traces in the malicious software.

In at least one embodiment of the disclosure, a method is disclosed that uses large-scale transformer models (e.g., Bidirectional Encoder Relations from Transformers (BERT)), knowledge graphs, and symbolic methods to discover and classify novel malicious software (also referred to herein as "novel malware"). It is known that transformer models can comprise deep learning models that utilize the concept of self-attention to differentially weight each piece of input data.

In at least one embodiment, a method of classifying malware uses a hybrid neuro-symbolic approach, and comprises collecting one or more sets of dynamic program traces from one or more instances of malware, and constructing and training a model (also referred to herein as Trace-BERT) using the one or more sets of dynamic program traces. Trace-BERT is further capable of encoding long-range contextual patterns of execution traces, which can be adapted to domain-specific datasets (e.g., collections of malware samples) and forms the basis for downstream program analysis tasks (e.g., classification and summarization).

In at least a further embodiment, a method for constructing a knowledge graph is disclosed. The method comprises collecting source material (e.g., textual descriptions of malicious actions and code samples), extracting textual explanations from the source material (e.g., subject and verb phrases) to define malicious concepts, embedding the malicious concepts into a real-valued vector space, dimensional reduction, clustering, and labeling. Examples of performing dimensional reduction, clustering, and labeling are known. The aforementioned knowledge graph may be constructed using semi-automated and/or automated learning methods to enable the labeling and identification of malicious action. The knowledge graph therefore anchors important text phrases and concepts obtained from the source material to their specific code execution traces.

In at least another embodiment, a method for understanding malicious behaviors and/or actions in a segment of software code is disclosed. The method utilizes the knowledge graph described above. Specifically, the method comprises constructing a joint multi-modal model using the textual explanations and the dynamic traces generated from the source material (e.g., by compiling code samples), matching the textual explanations and dynamic traces using a cross-attention network that allows "captioning" of the traces, constructing a generative model from the malicious concepts and their associated traces in the knowledge graph, and matching malicious behavior to the concepts, thereby explaining the malicious behavior.

In at least a further embodiment, a method for identifying hidden or novel malicious actions is disclosed. The method generally uses the concept of forced execution, which is typically done after construction of a knowledge graph to uncover hidden malicious actions. Specifically, the method comprises forcibly executing one or more code segments by mutating control flow (e.g., controlling branches), executing a path exploration feedback loop to uncover potentially hidden malicious actions and/or behaviors, obtaining execution traces for the hidden malicious actions and/or behaviors, wherein the execution traces may contain detailed information regarding system calls, files, network resources, and libraries used, embedding the execution traces into a vector space, clustering the embedded execution traces using, e.g., a benign operating system and/or a domain-adapted model such as, for instance, Trace-BERT, thereby defining known clusters and unknown clusters, labeling the known clusters with concepts in the knowledge graph using a cross-attention network; and constructing labels for the unknown clusters, thereby identifying and explaining these unknown clusters.

At least one embodiment of the disclosure can be placed and/or ported into a portable device or any peripheral (e.g., a universal serial bus (USB), external serial advanced technology attachment (eSATA), Thunderbolt, Institute of Electrical and Electronics Engineers (IEEE) 1394 (e.g., FireWire), etc. device), thereby creating a malicious software classification solution that can be used to protect a variety of computing devices and storage devices.

In at least a further embodiment, the malware explanation and classification methods, devices, and/or systems described herein comprise artificial intelligence (AI) that is anthronoetic (i.e., that thinks at a human level and with a human style).

At least one embodiment of the disclosure does not require access to the Internet, and functions in isolated environments without Internet access. The aforementioned at least one embodiment may also be capable of detecting and blocking novel and/or advanced malicious software.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 3 shows a sample article on hiding files using jprobes.

FIG. 5 displays a sample list of clustered phrases that are attached to a sample label "kernel" according to at least one embodiment of the present disclosure.

FIG. 8 shows a sample portion of a raw output from a Virtual Machine Introspection (VMI) for a single execution trace according to at least one embodiment of the present disclosure.

FIG. 9 shows a sample trace extraction of the trace shown in FIG. 8 according to at least one embodiment of the present disclosure.

DETAILED DESCRIPTION

Figure 1A:
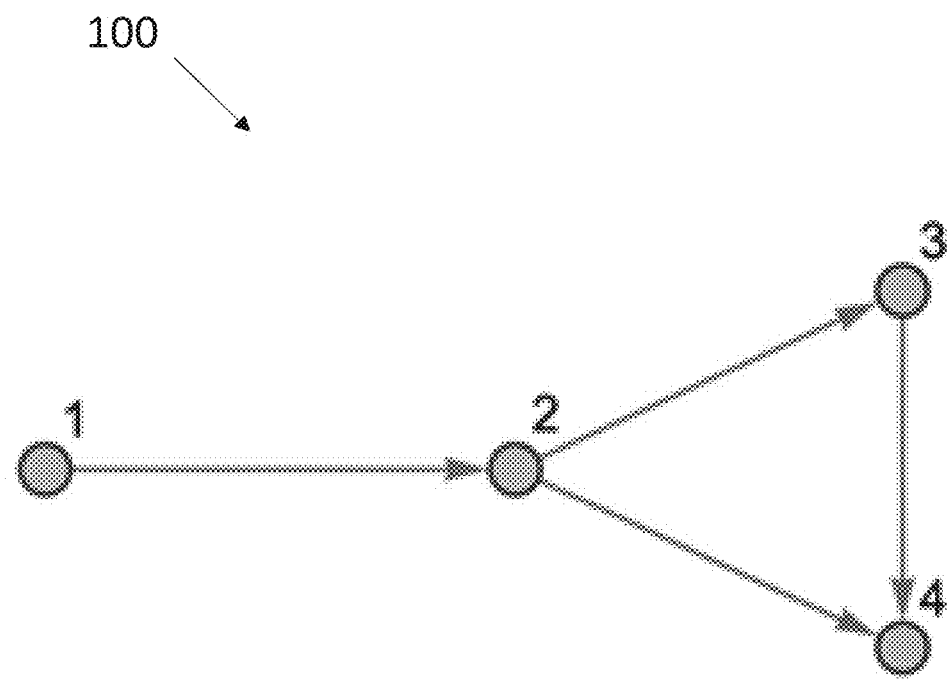
FIGS. 1A-1C show representations of a sample graph (FIG. 1A), a sample transformation of a graph (FIG. 1B), and an application of the sample transformation to the sample graph (FIG. 1C) according to at least one embodiment of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective-C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g. a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Embodiments of the disclosure comprise methods, devices, and/or systems that identify and understand malicious behaviors and/or actions in segments of software code, including, for instance, malware code.

In at least one embodiment, a method is disclosed that uses large-scale transformer models (e.g., Bidirectional Encoder Relations from Transformers (BERT)), knowledge graphs, and symbolic methods to discover and classify novel malicious software (also referred to herein as "novel malware").

A method for classifying malware is also disclosed, in which a hybrid neuro-symbolic approach is used. The method comprises collecting one or more sets of dynamic program traces from one or more instances of malware, and constructing and training a model (e.g., Trace-BERT) using the one or more sets of dynamic program traces. Trace-BERT is further capable of encoding long-range contextual patterns of execution traces, which can be adapted to domain-specific datasets (e.g., collections of malware samples) and forms the basis for downstream program analysis tasks (e.g., classification and summarization).

A method for constructing a knowledge graph is also disclosed, which comprises collecting source material (e.g., textual descriptions of malicious actions and code samples), extracting textual explanations from the source material (e.g., subject and verb phrases) to define malicious concepts, embedding the malicious concepts into a real-valued vector space, dimensional reduction, clustering, and labeling. The aforementioned knowledge graph may be constructed using semi-automated and/or automated learning methods to enable the labeling and identification of malicious action. The knowledge graph therefore anchors important text phrases and concepts obtained from the source material to their specific code execution traces.

A method for understanding malicious behaviors and/or actions in a segment of software code is also disclosed. The method utilizes the knowledge graph described above. Specifically, the method comprises constructing a joint multi-modal model using the textual explanations and the dynamic traces generated from the source material (e.g., by compiling code samples), matching the textual explanations and dynamic traces using a cross-attention network that allows "captioning" of the traces, constructing a generative model from the malicious concepts and their associated traces in the knowledge graph, and matching malicious behavior to the concepts, thereby explaining the malicious behavior.

A method for identifying hidden or novel malicious actions is also disclosed. The method generally uses the concept of forced execution. Specifically, the method comprises forcibly executing one or more code segments by mutating control flow (e.g., controlling branches), executing a path exploration feedback loop to uncover potentially hidden malicious actions and/or behaviors, obtaining execution traces for the hidden malicious actions and/or behaviors, wherein the execution traces may contain detailed information regarding system calls, files, network resources, and libraries used; embedding the execution traces into a vector space, clustering the embedded execution traces using, e.g., a benign operating system and/or a domain-adapted model such as, for instance, Trace-BERT, thereby defining known clusters and unknown clusters, labeling the known clusters with concepts in the knowledge graph using a cross-attention network, and constructing labels for the unknown clusters, thereby identifying and explaining these unknown clusters.

At least one embodiment comprises AI that is anthronoetic (i.e., that thinks at a human level and with a human style).

At least one embodiment of the present disclosure does not require access to the Internet and functions in isolated environments without Internet access.

At least one embodiment of the disclosure supports a wide range of platforms (including, but not limited to, ARM, x86, etc.), computer operating systems (including, but not limited to, Windows, Linux, etc.), and computer hardware (including, but not limited to, hard drives, solid state disks, etc.). A skilled artisan will recognize that the ability to support hard drives is important since they are still sold in many entry level computers and account for more than 50% of data storage sold, as of 2019. Thus, embodiments of the present disclosure protect a wide range of computing devices (e.g., servers, desktops, laptops, etc.) as well as universal serial bus (USB), Thunderbolt, SCSI, etc. device firmware, thereby protecting a wide range of portable devices. As a non-limiting example, embodiments of the present disclosure can be placed into the firmware that controls the USB device or other storage media, resulting in a universal solution that can protect previous (e.g., hard disk drive (HDD), compact disc (CD), digital video disks or digital versatile disks (DVD), etc.), current (e.g., NAND memory devices, NOR flash memory devices, etc.), and next-generation (e.g., phase-change and/or memristor) data storage devices and/or technologies.

Knowledge Graph Construction

At least one embodiment of the present disclosure utilizes computations based on representations in graphs. As used herein, the term "graph" means one or more sets of abstract elements and the abstract relations therebetween. Thus, a "hypergraph," at least as that term is used herein, is a graph comprising nodes and generalized edges, the latter of which may be referred to as "hyperedges" and may connect any number of the aforementioned nodes. For example, FIG. 1A is a graph 100 depicting the set $\{\{1, 2\}, \{2, 3\}, \{3, 4\}, \{2, 4\}\}$.

In at least one embodiment, one or more grammar sets of grammatical rules are applied to one or more graphs. A non-limiting example of a grammatical rule is $\{\{x, y\}, \{x, z\}\} \rightarrow \{\{x, z\}, \{x, w\}, \{y, w\}, \{z, w\}\}$. This rule says: make a subset of two relations from the set and determine if the elements match the pattern $\{\{x, y\}, \{x, z\}\}$. If the made set does match, then replace ("rewrite") these two relations with the four relations $\{\{x, z\}, \{x, w\}, \{y, w\}, \{z, w\}\}$. This rule can be represented as a transformation of graphs (also referred to herein as "transformational generative grammar"), as shown in FIG. 1B. Specifically, transformation 120 is shown from graph 122 to graph 124.

Figure 1B:
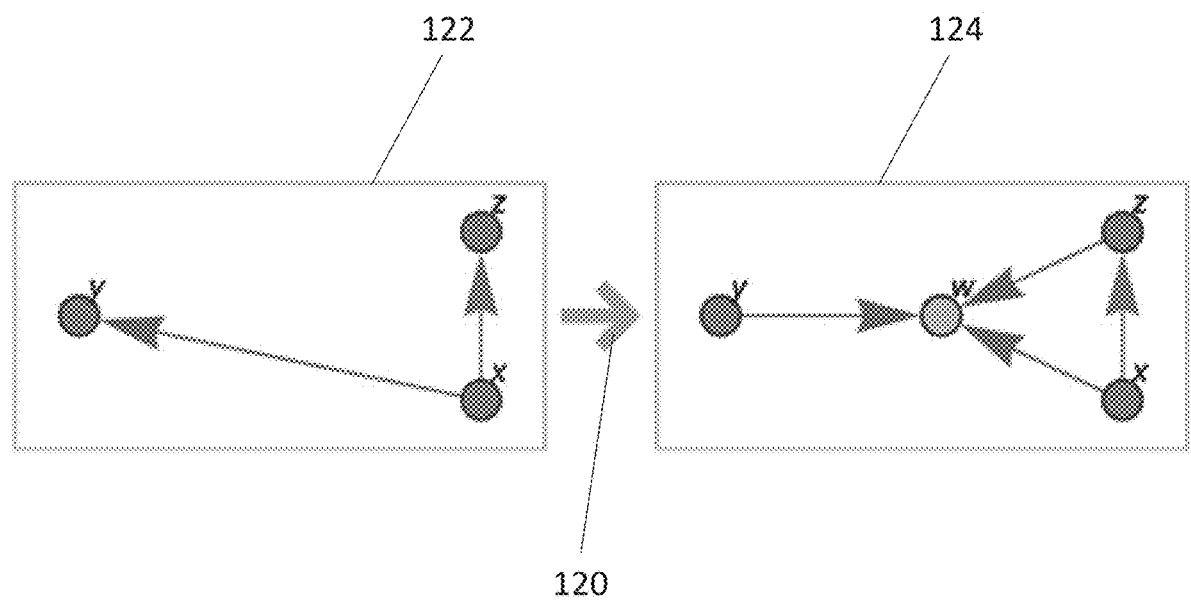
Figure 1C:
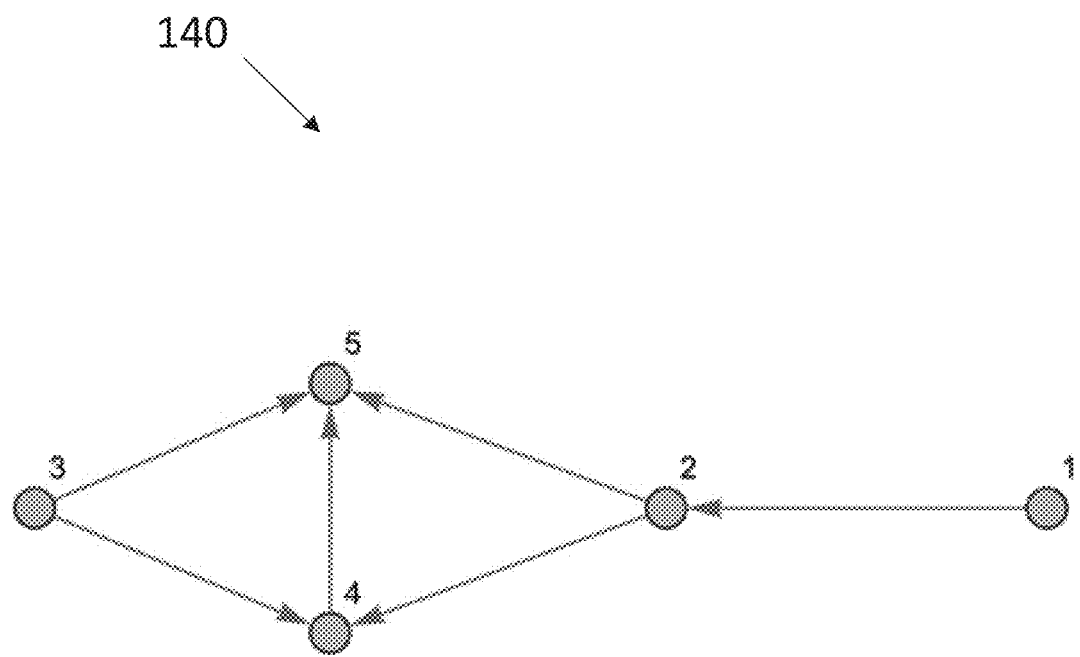

If the aforementioned rule is applied to the set $\{\{1, 2\}, \{2, 3\}, \{3, 4\}, \{2, 4\}\}$ shown in FIG. 1A, the $\{2, 3\}$ and $\{2, 4\}$ relations match, so the rule replaces them with four new relations, generating $\{\{1, 2\}, \{3, 4\}, \{2, 4\}, \{2, 5\}, \{3, 5\}, \{4, 5\}\}$. The derivation can be represented in the graph 140, as shown in FIG. 1C. If the grammatical rule continues to be applied, one of skill in the art will understand that increasingly complex graphs can be generated.

Figure 2:
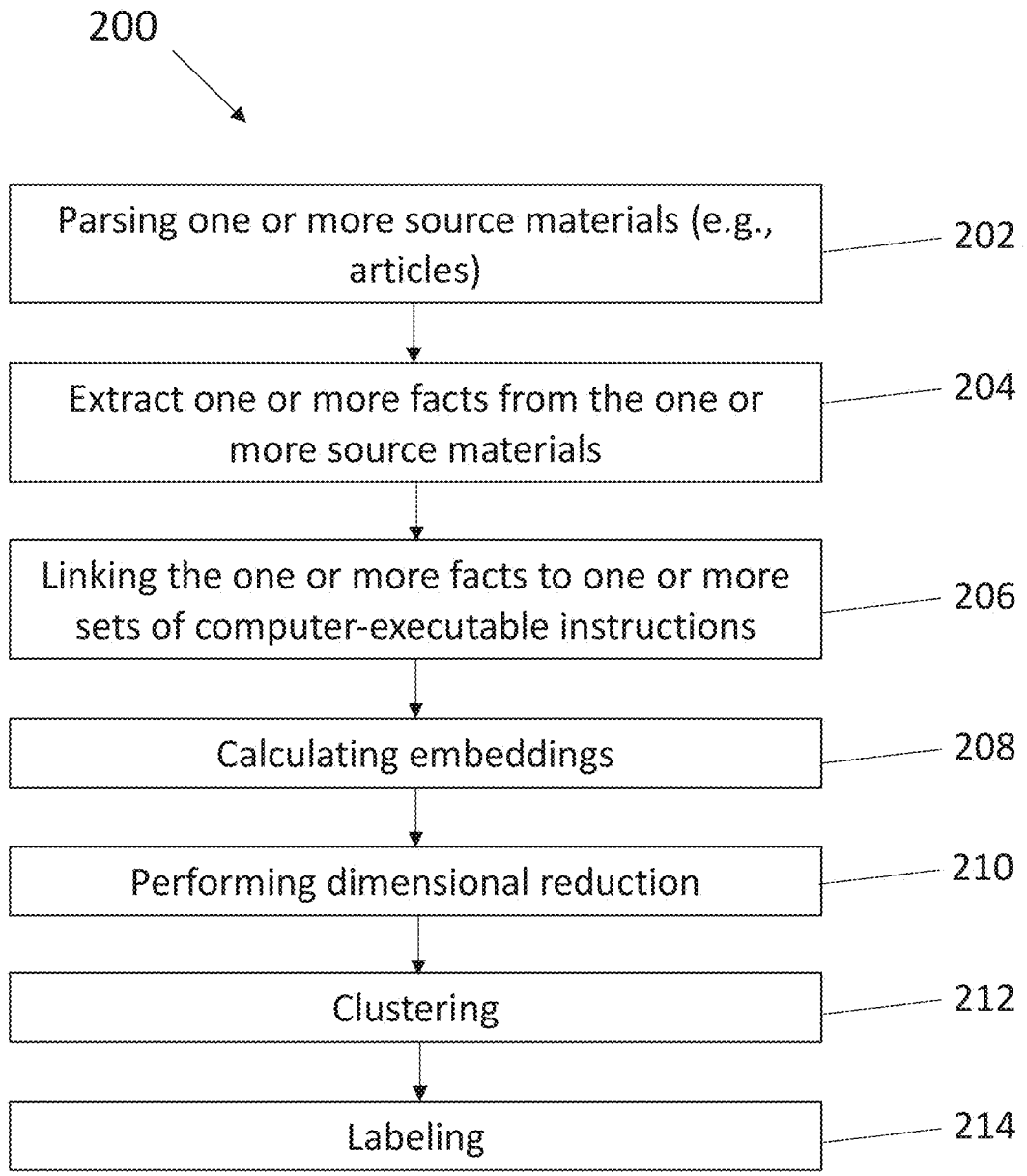
FIG. 2 shows a method for generating a knowledge graph to understand malicious actions in a segment of software code according to at least one embodiment of the present disclosure.

In at least one embodiment, a method 200 for generating a knowledge graph is shown in FIG. 2. The method 200 comprises a step 202 of parsing one or more source materials, a step 204 of extracting one or more facts from the one or more source materials, a step 206 of linking the one or more facts to one or more sets of computer-executable instructions (e.g., software code), a step of 208 of calculating embeddings, a step 210 of performing dimensional reduction, a step 212 of clustering, and a step 214 of labeling.

The aforementioned one or more source materials may comprise articles, websites, scientific papers, and/or other information that contains natural language text and sample source code, assembly, and/or operation codes (also referred to herein as "opcodes"). Source materials can provide clear and logical descriptions of code, assembly, and/or opcodes to help identify malicious activities and computer fundamentals. Background knowledge about general concepts such as users, files, and processes can be included from reference materials (e.g., books on the functioning and design of various operating systems).

One non-limiting example of a source material for malicious software source code and textual descriptions is Phrack, which is an online magazine (also referred to herein as an "ezine") written by, and for, hackers. Other such examples include Blackhat presentations and malware reverse engineering websites). Turning now to FIG. 3, a sample article 300 on hiding files using jprobes is shown. The article shows both code and textual descriptions of concepts. Highlighted portions 302 and 304 can be extracted into a concept for the knowledge graph, including any of the knowledge graphs described herein.

Parsing One or More Source Materials

Parsing one or more source materials to extract headings, text, and/or code segments from the one or more source materials may require pre-processing. Such pre-processing is used to clean up the text to remove redundancies and extract headings, text sections, and code from the source materials. Keyword discovery (using methods such as, for instance, Normalized (Pointwise) Mutual Information, see G. Bouma, "Normalized (pointwise) mutual information in collocation extraction," *Proc. GSCL* 31-40 (2009)) may be used to identify common terms. These common terms can then be combined into phrases via tokenization (e.g., via Rapid Automatic Keyword Extraction). These phrases are used to identify and label concepts.

Non-limiting examples include combining words like "text segment," "file hiding," and "return address" into singular tokens which can then be used as the basis for learned concepts. Source code must also be understood so that variables and function names can be extracted and associated with their textual descriptions.

In at least one embodiment, the aforementioned is accomplished by turning open-source natural language processing tools such as spaCy. spaCy is an open-source software library for advanced natural language processing. spaCy supports deep learning workflows that allow connecting statistical models trained by popular machine learning libraries like TensorFlow, PyTorch, or MXNet through its own machine learning library Thinc. Using Thinc as its backend, spaCy features convolutional neural network models for part-of-speech tagging, dependency parsing and named entity recognition (NER). Prebuilt statistical neural network models to perform these tasks are available for a wide range of languages, including English, Spanish, Greek, and German.

The NER model in spaCy is a transition-based system based on the chunking model. Tokens are represented as hashed, embedded representations of the prefix, suffix, shape, and lemmatized features of individual words. Labeled and annotated code examples that identify variables, functions, and expressions can be used to tune and optimize spaCy to parse the code examples from the source materials.

With respect to keyword discovery, the aforementioned Normalized (Pointwise) Mutual Information concentrates on identifying two-part multi-word units and involves comparing the statistical distribution of the combination to the distribution of its constituents through an association measure. This measure is then used to rank candidates extracted from a corpus and the top-ranking candidates are then selected for further consideration as collocations. Rapid Automatic Keyword Extraction is a domain independent keyword extraction algorithm that can determine key phrases in a body of text by analyzing the frequency of word appearance and its co-occurrence with other words in the text. Both of these techniques, along with the Dunnings likelihood ratio (see T. Dunning, "Accurate methods for the statistics of surprise and coincidence," *Comp. Linguistics* 19 (1): 61-74 (1993)), which analyzes counts of events that occur together, can be used to detect likely word combinations that can be used for knowledge graph entries. These entries can then be pruned to build a custom vocabulary based on the information extracted from the source materials. It should be appreciated that libraries (e.g., stdio.h and stdlib.h) can also be used to add words (e.g., function names, variable names, memory regions) to the custom vocabulary.

Extracting One or More Facts

Figure 4:
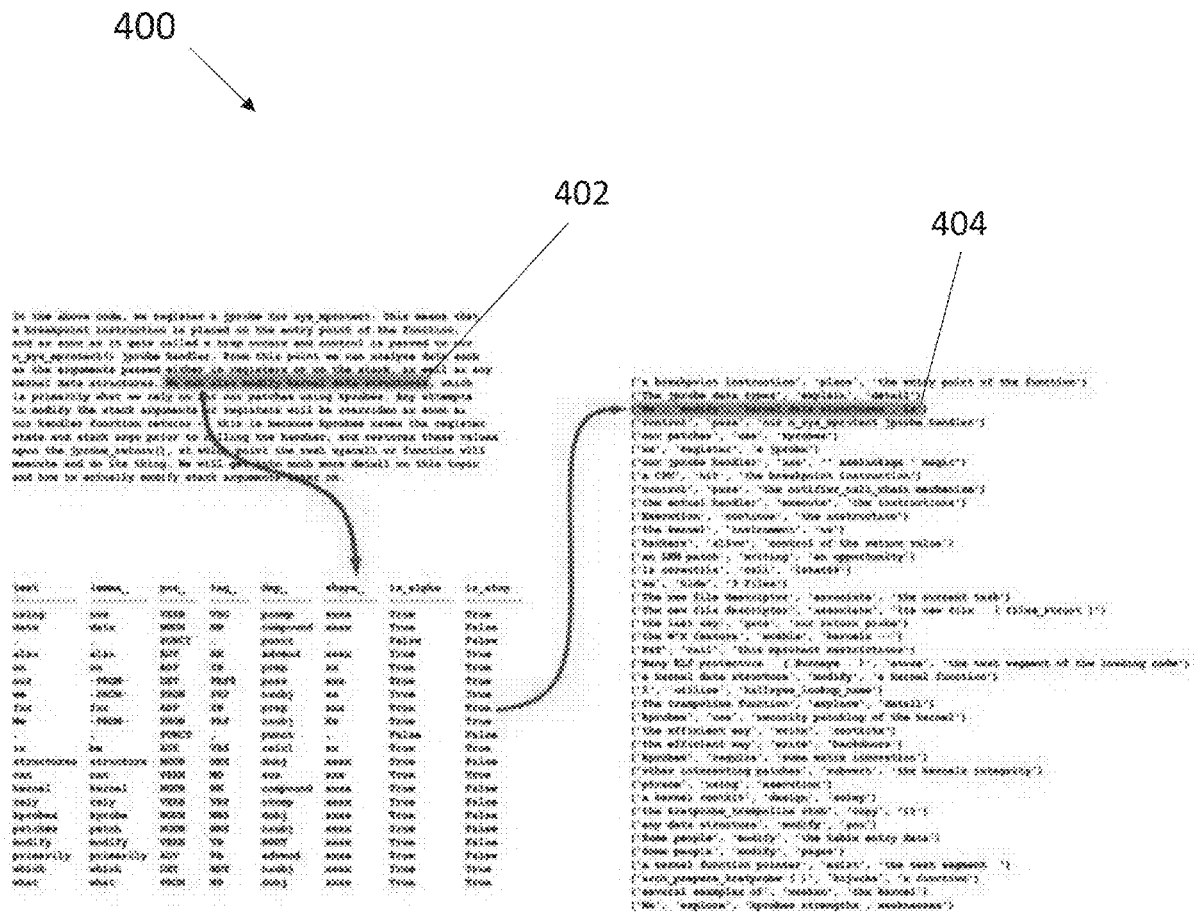
FIG. 4 displays an approach to parsing sentences to identify and extract parts of speech according to at least one embodiment of the present disclosure.

To extract one or more facts from the source material, sections of the source material can be separated into sentences. Each sentence is then parsed to identify parts of speech, as shown in the source material 400 depicted in FIG. 4. Specifically, the parts of speech for each portion of text and/or each sentence (e.g., text 402) are identified and then decomposed into subject-verb-object triples 404. The subject can denote the resource, and the verb can denote traits or aspects of the resource and expresses the relationship between the subject and the object. The triples can then be formed into a Resource Description Framework (RDF) knowledge graph where edges flow from subjects to objects and are labeled with verbs.

For example, one way to represent the notion that "a breakpoint instruction is placed on the entry point of the function" in RDF is to use a subject-verb-object triple where the subject denotes "a breakpoint instruction," the verb "is placed," and an object is "the entry point of the function." Subjects, verbs, and objects within sentences can form source nodes, edges, and target nodes, respectively, for the RDF knowledge graph. Tools such as spaCy's English model may be used.

Linking One or More Facts and Calculating Embeddings

Labeled clusters can be created using word-embedding representations of the subject and object words, and then associating code traces from compiled samples to representative elements from the object clusters. It should be appreciated that such embedding is the collective name for a set of language modeling and feature learning techniques in natural language processing (NLP), where words or phrases are mapped to vectors of real numbers.

This mapping can involve a mathematical embedding from a space with many dimensions per word to a continuous vector space with a much lower dimension. The entities are not defined manually, but rather extracted from the source material and the code sections using one or more transformers (e.g., BERT).

It should be appreciated that transformers are a form of deep machine learning models that are used in the NLP field. Like recurrent neural networks (RNNs), transformers are designed to handle ordered sequences of data, such as natural language, for various tasks such as machine translation and text summarization. However, unlike RNNs, transformers do not require that the sequence be processed. Therefore, if the data in question is natural language, the transformer does not need to process the beginning of a sentence before it processes the end. As a result, the transformer allows for more parallelization than RNNs during training. BERT specifically improves transformers by bidirectionally training the language model. This approach is in contrast to previous efforts, which looked at a text sequence either from left to right or combined left-to-right and right-to-left training. This bidirectionally trained language model has a deeper sense of language context and flow than single-direction language models since words are learned based on all of their surroundings (e.g., both to the left and right of the target word or token).

An often-used workflow for natural language processing involves downloading and then fine-tuning large pre-trained models, which is expensive, slow, and time-consuming. Adapters provide a method to avoid fine-tuning by inserting a small set of additional, newly-initialized weights at each layer of a pre-trained model. See, e.g., S. Gururangan et al., "Don't Stop Pretraining: Adapt Language Models to Domains and Tasks," arXiv preprint available at arXiv: 2004.10964 (2020). These new weights are trained on specific sources or tasks (e.g., domain adapted) while the pre-trained parameters of the large model are kept frozen and fixed. This permits leveraging of information from specific tasks, domains, or languages that is more relevant for specific applications, such as, in at least one embodiment of the present disclosure, extracting facts from hacker texts, articles, websites, and scientific papers with code examples.

Transformer models with attention mechanisms provide high-resolution insight into natural language text. A large parameter transformer model, such as BERT, will be pre-trained (adapted) on datasets of hacker texts, articles, websites, and papers with code examples. Adapting this model with domain-specific data sets (e.g., hacker texts) improves performance and accuracy in extracting facts from source materials (e.g., articles and papers). These facts can then be associated with code and its dynamic execution trace (e.g., as shown in block 206 of method 200). Other transformer models, such as a "reformer" model that has a memory-efficient attention mechanism that can process long sequences, can also be used.

A skilled artisan will appreciate that training large transformer models can be prohibitively costly, especially on long sequences. Two techniques can improve the efficiency of transformers to handle long sequences, including the replacement of the dot-product attention and the use of reversible residual layers. See, e.g., N. Kitaev et al., "Reformer: The Efficient Transformer," arXiv preprint available at arXiv:2001.04451 (2020). The replacement of dot-product attention by one that uses locality-sensitive hashing changes its complexity from $O(L^2)$ to $O(L \log L)$, where L is the length of the sequence, thus making it more efficient. Using reversible residual layers instead of the standard residuals permits storing activations only once in the training process, instead of N times, where N is the number of layers. The resulting reformer model performs on par with transformer models, while being more memory-efficient and faster in processing long sequences.

After the textual descriptions in the source materials have been processed and their code sections extracted, compiled, and executed, they can be used to create a domain-adapted model (which is also referred to as "PhrackBERT" herein). A second model, which is a sequence-to-sequence model (which is also referred to as "TraceBERT" herein), can also be built using large-scale sets of dynamic program traces from general operating system and application workloads.

TraceBERT can also use the reformer model and the aforementioned attention mechanism changes to encode long-range contextual patterns in dynamic execution traces. The source code (via execution traces) provides a constrained vocabulary that is sufficient to create mappings to concepts extracted from natural language by using vectorized distances of word embeddings. Then, knowledge representations that connect the conceptual relationships are built from explanatory sources (e.g., execution traces, source code, and descriptions about why and how the code works). This results in an unambiguous association between concepts and machine code, which improves upon known techniques. The knowledge graph of reference text and code (via execution traces) provides a method of searching for other software models that are semantically similar in other software programs (e.g., unknown software).

Dimensional Reduction, Clustering, and Labeling

After the steps of linking the one or more facts to one or more sets of computer-executable instructions (e.g., as in block 206) and calculating embeddings (e.g., as in block 208), dimensional reduction (e.g., as shown in block 210) is performed. To reduce the dimensionality of the input space for clustering, a Uniform Manifold Approximation and Projection (UMAP) transformation, see, e.g., L. McInnes et al., "UMAP: Uniform manifold approximation and projection for dimension reduction," arXiv preprint available at arXiv:1802.03426 (2018), is applied to the contextual word embeddings. A skilled artisan will recognize that UMAP is a non-linear dimensionality reduction technique for embedding high-dimensional data for visualization in a low-dimensional space. Specifically, UMAP models each high-dimensional object by a ten-dimensional point in such a way that similar objects are modeled by nearby points and dissimilar objects are modeled by distant points with high probability.

For clustering, hierarchical density-based spatial clustering of applications with noise (HDBSCAN), see, e.g., L. McInnes, et al., "hdbscan: Hierarchical density based clustering," J. Open Source Software 2.11:205 (2017) can be used. HDBSCAN is a data clustering algorithm that groups together points of varying densities that are closely packed together (e.g., points with many nearby neighbors). This marks, as outliers, points that lie alone in low-density regions (e.g., regions whose nearest neighbors are too far away). HDBSCAN can return clustering with little or no parameter tuning, while the primary parameter (minimum cluster size) is intuitive and easily selectable.

Applying HDBSCAN with the UMAP transformation only on subject nodes excludes noise (e.g., unclustered points) to create hierarchical entities. If HDBSCAN is used without a UMAP transformation on the objects, syntactically similar nodes are combined. This captures an intuitive sense that there are more objects than subjects in the collected one or more facts. Finally, objects are connected (with noise) to subject entities based on their original (e.g., subject, verb, object) association. Subsequently, extracted variables and functions are compared to the object nodes and are connected when the similarity exceeds a predetermined threshold.

Turning now to FIG. 5, a sample list 500 of clustered phrases is shown, which are attached to the sample label "kernel." This list shows the results after the extraction of triples, dimensional reduction, and clustering of phrases. Thus, FIG. 5 shows fifteen word groupings and phrases 502, 504, 506, 508, 510, 512, 514, 516, 518, 520, 522, 524, 526, 528, and 530 that have been mapped to a single cluster that relates to an operating system kernel.

Uncovering Hidden Malicious Behaviors

In order to uncover malicious behavior, and evasive behavior in particular, of a target executable, at least one embodiment of the disclosure uses forced execution to elicit to elicit the discovery of interesting code units. Generally, forced execution can generate program variants by mutating control flow and using a path exploration feedback loop to uncover potentially hidden malicious behaviors. See W. You et al., "PMP: Cost-effective Forced Execution with Probabilistic Memory Pre-Planning," 2020 IEEE Symposium on Security and Privacy (Spring 2020 Proceedings).

Recent malicious software (e.g., malware) often has payload that is only released when certain conditions are satisfied. Therefore, it is difficult to fully uncover the payload by simply executing the malicious software. In addition, malicious software samples may be equipped with cloaking techniques, such as packing and virtual machine (VM)/debugging detectors, which stop execution once it detects the malicious software is being monitored. Additionally, malicious software can make use of time-bombs and logic-bombs that define very specific temporal and contextual conditions to release the payload.

Forced execution can be used to penetrate malicious software self-protection and expose hidden behavior by force-setting specific branch outcomes. Accordingly, forced execution can be a better approach to understanding malicious software behavior than other known methods, such as running such software in a sandbox. Indeed, a known difficulty in running malicious software in a sandbox is that the needed environment or setup may not be present (e.g., a critical command and control server is down or needed libraries are missing). This means that the malicious software cannot be executed.

In at least one embodiment, a method is disclosed that uses forced execution to penetrate malicious software self-protection mechanisms and trigger conditions by force-setting branch outcomes of certain conditional instructions (e.g., those checking trigger conditions). It should be appreciated that the forced execution is very close to a native execution, naturally handling libraries and dynamically generated code. Specifically, forced execution can achieve crash-free execution, with probabilistic guarantees, through a novel memory pre-planning phase. This phase comprises pre-allocating a region of memory starting from address 0 and filling the region with carefully crafted random values.

The aforementioned values are designed in such a way that (1) if they are interpreted as addresses and further dereferenced, the addresses fall into the pre-allocated region and do not cause exception, and (2) they have diverse random values such that semantically unrelated pointer variables unlikely dereference the same random address and avoid causing bogus program dependencies and corrupted states. In at least one embodiment, an execution engine is developed to systematically explore different paths by force-setting different sets of branch outcomes. For each path, multiple processes are spawned to execute the path with different randomized memory pre-planning schemes, further reducing the probability of coincidental failures. The results of these processes are aggregated to derive the results for the particular path. The engine then moves forward to the next path.

Forced execution therefore provides a practical solution to systematically explore different execution paths (and hence reveal different program behaviors) without any input or environment setup. It works by force-setting branch outcomes of a small set of predicates and jump tables. However, one problem faced by standard forced execution methods is invalid memory accesses due to the absence of necessary memory allocations and initializations that are present in normal execution. Without appropriate handling of invalid memory accesses, the program is most likely to crash before reaching any malicious payload.

Accordingly, in at least one embodiment of the disclosure, the forced execution procedure utilizes a randomized memory preplanning technique (referred to herein as "probabilistic memory planning" or "PMP") to handle invalid memory accesses with probabilistic guarantees. Instead of allocating new memory blocks on demand, PMP pre-allocates a large memory block with a fixed size (e.g., 4 megabytes (MB)) when the program is loaded. The pre-allocated memory area (PAMA) is filled with carefully crafted random values such that, if these values are interpreted as memory addresses, the corresponding accesses still fall into PAMA. This is also referred to herein as "self-contained memory behavior" or "SCMB." In addition, these random values are designed in a way that they are self-disambiguated. That is, it is highly unlikely that two semantically unrelated memory operations access the same random address, causing bogus dependencies. This is also referred to herein as "self-disambiguated memory behavior" or "SDMB."

PMP may also initialize global variables, local variables, and heap regions allocated by the original program logic with random values pointing to PAMA. Otherwise, these variables are initialized to 0 by default. As such, when the variables are interpreted as pointers and dereferenced without being properly initialized along some forced path, the accesses still fall in PAMA and also have a low likelihood of colliding on the same address. Through SCMB, PMP enables crash-free memory operations, which are critical for forced execution. It should be appreciated that, in at least one embodiment, PMP does not require tracing memory operations or performing on-demand allocation, thereby allowing it to achieve near native execution speeds. Through SDMB, PMP respects program semantics such that it can faithfully expose program behaviors (including hidden program behaviors) with probabilistic guarantees.

It should be appreciated that the aforementioned can be equivalent to pre-allocating many small regions that are randomly distributed. This is particularly suitable for heap accesses in forced-execution as they tend to happen in smaller memory regions. Even if overflows might happen, the likelihood of critical data being over-written is low due to the random distribution.

Figure 6:
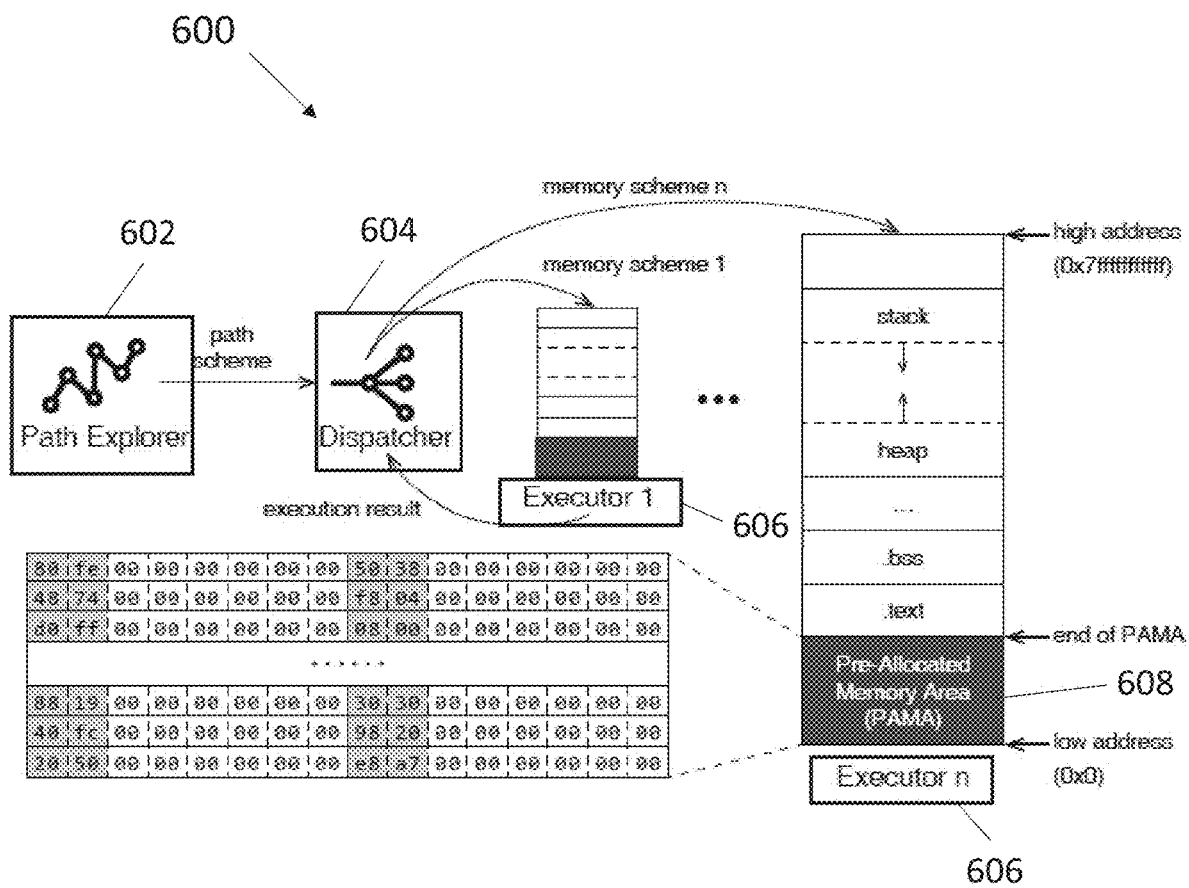
FIG. 6 is a diagram of the architecture of probabilistic memory planning (PMP) according to at least one embodiment of the present disclosure.

Turning now to FIG. 6, a diagram of the architecture of PMP 600 is shown according to at least one embodiment of the disclosure. The data displayed in FIG. 6 is presented in the little-endian format for the x86 64 architecture, where the bytes in gray are free to be filled with 8-multiple random values. As can be seen, there are four main components of PMP: the path explorer 602, the dispatcher 604, the executors 606, and the pre-allocated memory area (PAMA) 608. Each of these components will now be described in additional detail. The data is presented in the little-endian format for the x86-64 architecture where the bytes in gray are free to be filled with 8-multiple random values.

Path Explorer

Given a target binary, the path explorer (e.g., path explorer 602) systematically generates a sequence of branch outcomes to enforce, including setting the conditional instructions and their true/false values. This technique, called a "path scheme," can also be used to explore macros and scripts. See, e.g., X. Hu et al., "Jsforce: A forced execution engine for malicious javascript detection," *Intl. Conf. on Security and Privacy in Comm. Sys.*, Springer (2017). In essence, path exploration is a search process that aims to cover different parts of the subject binary. In each round, a new path scheme is determined by switching additional/different predicates, or enforcing additional/different jump table entries, to improve code coverage. Since the search space of all possible paths is prohibitively large for real-world binaries, PMP uses several strategies, including, but not limited to, linear search, quadratic search, and exponential search. In each round, linear search can select a new predicate or jump table entry to enforce, which is usually the last one that does not have all its branches covered in previous rounds. The exponential strategy aims to explore all combinations of branch outcomes and, due to the expense, is often only used to explore more critical code regions. Quadratic search falls in between the two. On average, PMP according to at least one embodiment of the disclosure covers 83.8% instructions, 79.1% basic blocks, and 91.8% functions. Additional reinforcement learning techniques can also be used to improve coverage. See, e.g., A. Badia et al., "Never Give Up: Learning Directed Exploration Strategies," arXiv (2020): arXiv-2002.

Dispatcher

The dispatcher (e.g., dispatcher 604) aggregates execution results (e.g., code coverage and program dependencies) of multiple executors in a conservative fashion. Specifically, it considers a result valid if, and only if it is agreed by a set number of executors. Such aggregation further improves probabilistic guarantees. Accordingly, PMP can ensure that a reported result has lower than p∈[0,1] probability to be incorrect during a single execution (e.g., on an executor), due to the accidental violations of SCMB or SDMB. The aggregation further reduces the probability to $p^n$ if the memory schemes on the various executors are truly randomized and hence independent.

Executor(s)

All executors (e.g., executors 606) can be forked from the same main process with the same initialized PAMA. Each executor then enforces a given path and memory scheme assigned to the executor. Such a design avoids the redundant initialization of PAMA. It should be appreciated that all memory accesses must start from some variable, whose value is fully randomized across executors.

Pre-Allocated Memory Area (PAMA)

For each path scheme, PMP can further generate multiple versions of variable initializations, each having different initial values but satisfying both SCMB and SDMB. This is referred to as "memory schemes." Multiple memory schemes can reduce the likelihood of coincidental address collisions. A process is forked for each path and memory scheme and distributed to an executor for execution. At the end of a round, the dispatcher aggregates the results from the executors (e.g., coverage). Another path scheme is then computed by the path explorer to get into the next round, based on the results from previous rounds.

Figure 7A:
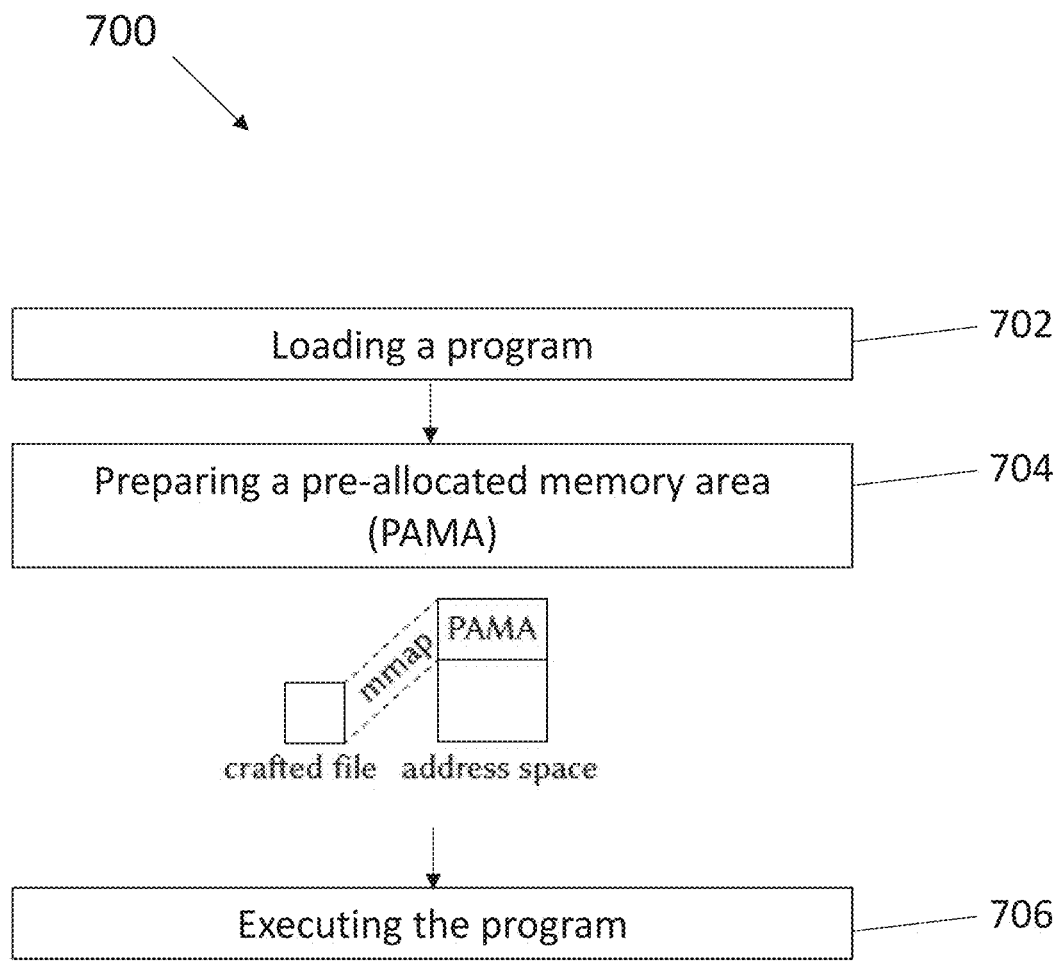
FIGS. 7A-7B show a method for memory preplanning according to at least one embodiment of the present disclosure.

Turning now to FIG. 7A, a method 700 for memory preplanning is shown. First, a program is loaded at block 702. Then, a pre-allocated memory area (PAMA) is prepared at block 704 by, e.g., invoking the mmap system call to map a crafted file to the program address space. The file content is randomly generated beforehand. The program is then executed at block 706, during which program variables are initialized with random values that point into the pre-allocated memory area so that, when they are used, the program does not crash.

The method 700 for memory preplanning can handle exceptional memory operations (e.g., that are caused by forced execution). As such, all the values filled in PAMA are essentially in preparation for these values being interpreted as addresses and further dereferenced. It is completely possible that the subject binary does not interpret values from PAMA as addresses. For example, it may interpret a PAMA region as a string and access individual bytes in the region. In such cases, the accessed values are just random values.

In the PAMA preparation at block 704, PAMA is mapped at the lower part of the address space starting from 0x0, in order to accommodate null pointers or pointers with invalid small values. The word-aligned addresses within PAMA (e.g., those having 0 at the lowest three bits) are filled with carefully crafted random values such that, if these values are interpreted as addresses, they fall within PAMA. As such, the range of random values that can be filled is dependent on the size of PAMA. For instance, for a 64 kilobyte (kb) PAMA (e.g., in the address range of [0, 0xffff]), the first two least-significant bytes of a filling value are free to be set with a random eight-multiple value. Other bytes are fixed to zero. It should be noted that such a value can be viewed essentially as a valid word-aligned address in PAMA.

Figure 7B:
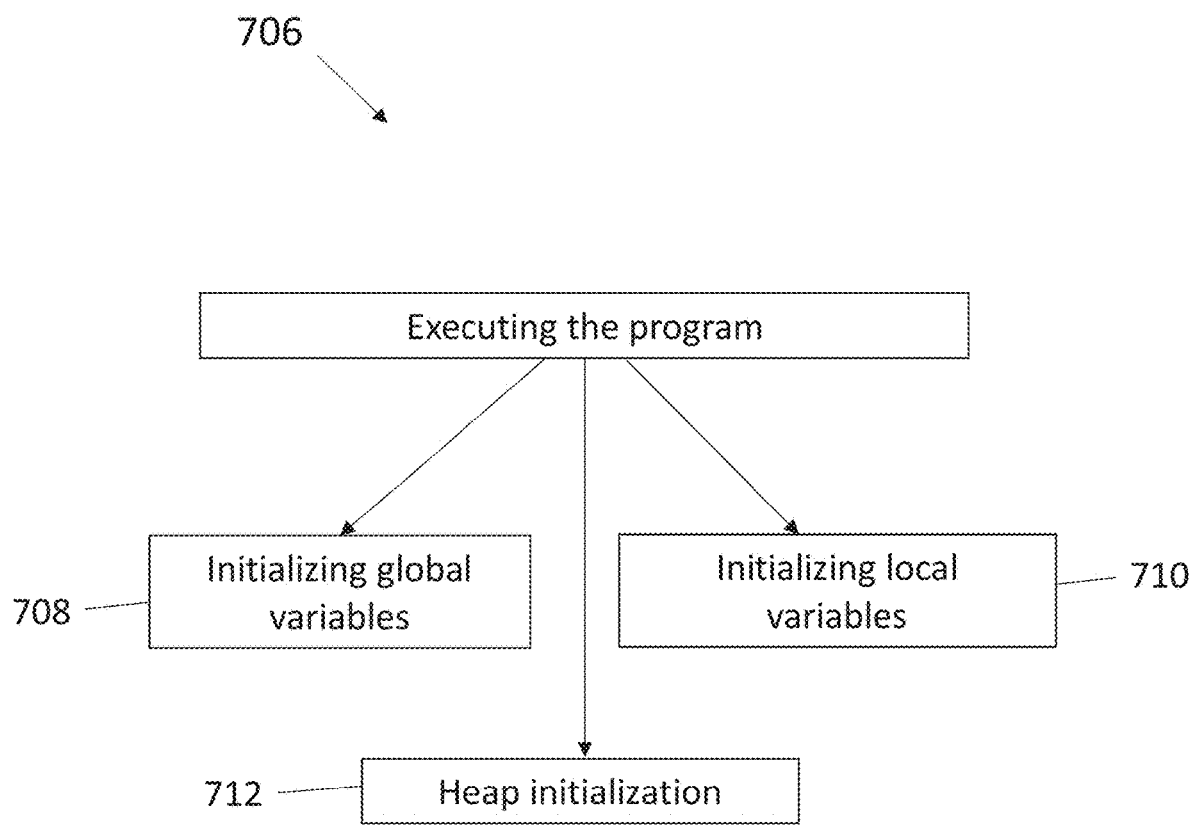

In at least one embodiment, during the program execution at block 706, program variables (e.g., global variables, local variables, and heap regions) are initialized by PMP with random eight-multiple values pointing to PAMA. As shown in FIG. 7B, the program execution at block 706 can further comprise (1) block 708 of global variable initialization, (2) block 710 of local variable initialization, and (3) block 712 of heap initialization.

For block 708, in an ELF binary, the uninitialized or zero-initialized global variables are stored in the .bss segment. During loading, PMP reads the offset and size information of the .bss segment from the ELF header. PMP then initializes the segment like a heap region.

Initializing local variables 710 can occur after initializing PAMA and before spawning the executors. PMP initializes the entire stack region like a heap region. It should be appreciated that stack frames are pushed and popped frequently, and the same stack address space may be used by many function calls. As such, the stack space may need to be re-initialized. One solution is to identify stack frame allocations (e.g., updates of rsp register) and conduct initialization after each allocation. However, due to the flexibility of stack allocations, it is difficult to precisely identify them. PMP instead intercepts each function invocation. Then, starting from the current address denoted by rsp, it randomly checks eight unevenly distributed addresses lower than the rsp address (e.g., the potential stack space to be allocated), in order from high to low, to see if they are PAMA addresses (that is, meaning that they were not overwritten by previous function invocations). These addresses can also be referred to as "canaries" and the variable $C_i$ can be used to denote the ith canary. PMP identifies the lowest (last) canary that is not a PAMA address, say, for example, $C_t$, and then re-initializes $[C_{t+1}, rsp]$. It should be noted that the stack grows from higher addresses to lower addresses. If all eight *canaries* are overwritten, PMP continues to check the next eight. In this context, since stack writes may not be continuous, this detection scheme has probabilistic guarantees.

For block 712, PMP intercepts all memory allocations and sets the allocated regions to contain random word-aligned PAMA addresses. PMP writes these values to each word-aligned address in the heap region. If a regular compiler is used to generate the subject binary, the compiler would enforce pointer-related memory accesses to be word-aligned through padding.

Thus, in at least one embodiment of the disclosure, PMP intercepts (1) the program entry point for initializing global variables, (2) call instructions for initializing local variables, and (3) memory allocations for initializing heap regions. It should be appreciated that PAMA preparation happens a priori and incurs negligible runtime overhead, while variable initialization occurs on-the-fly during execution. Both are generic and do not require case-by-case crafting.

Virtual Machine Introspection

PMP uses conditional jumps and indirect jumps to enforce a given path scheme, which is a sequence of branch outcomes that need to be enforced. By using Virtual Machine Introspection (VMI), it is possible, in at least one embodiment of the disclosure, to stealthily (e.g., without the target program or operating system knowing it is being observed or controlled) uncover jumps and also to control their outcomes as well.

A hypervisor or virtual machine monitor is computer software, firmware, or hardware that creates and runs virtual machines. Xen is a known open-source type-1 hypervisor that uses a microkernel design and provides services that allow multiple computer operating systems (e.g., Linux-based, Android-based, Windows-based, and macOS-based) to be executed on the same computer hardware concurrently. Responsibilities of the hypervisor can include memory management and central processing unit (CPU) scheduling of all virtual machines (also referred to herein as "domains"), and for launching the most privileged domain (also referred to herein as "dom0"), which is the only software that has direct access to hardware by default. From dom0, the hypervisor can be managed and unprivileged domains (also referred to herein as "domU") can be launched.

The hypervisor can also provide an avenue to observe domU, commonly called Virtual Machine Introspection (VMI). VMI enables monitoring of low-level details (e.g., memory, hardware events, system calls, and registers) of a running domU from dom0 without an agent (e.g., software running in domU) or any modification to any portion of domU. VMI is highly optimized and runs at near-native speeds by using multiple cache layers and cache management. At least one embodiment of the disclosure runs in the control domain, dom0, to make use of direct memory access (DMA) through the LibVMI library. Within the control domain, hypervisor features can also be accessed to control virtualization extensions provided by the CPU, such as, for instance, the Second Level Address Translation (SLAT). This is also known as Stage-2 page-tables for ARM or Extended Page Tables (EPT) for x86.

Second Level Address Translation (SLAT)

Modern processors use the concepts of physical memory and virtual memory, running processes use virtual addresses and when an instruction requests access to memory, the processor translates the virtual address to a physical address using a page table or translation lookaside buffer. When running a virtual system, the processor can allocate virtual memory of dom0 that serves as a physical memory for domU, and the same process of address translation also occurs within domU. This increases the cost of memory access since the address translation needs to be performed twice, once inside domU (e.g., using software-emulated shadow page table), and once inside dom0 (e.g., using a hardware page table).

To make this translation more efficient, processor vendors can implement technologies commonly referred to as SLAT. By treating each domU-physical address as a dom0-virtual address, a slight extension of the hardware used to walk a non-virtualized page table (now the domU page table) can walk the dom0 page table. With multilevel page tables, the dom0 page table can be viewed conceptually as nested within the domU page table. A hardware page table walker can treat the additional translation layer almost like adding levels to the page table.

Using SLAT and multilevel page tables, the number of levels needed to be walked to find the translation doubles when the domU-physical address is the same size as the domU-virtual address and the same size pages are used. This increases the importance of caching values from intermediate levels of the dom0 and domU page tables. It is also helpful to use large pages in the dom0 page tables to reduce the number of levels (e.g., in x86-64, using 2 MB pages removes one level in the page table). Since memory is typically allocated to virtual machines at coarse granularity, using large pages for domU-physical translation reduces the depth of look-ups and the memory required for dom0 page tables.

Hiding Inspection from Malware

In order to facilitate access to events associated with the execution of domU VMs, at least one embodiment of the disclosure uses a combination of techniques to trigger a transfer of control to the hypervisor (also referred to as "VMEXIT") when required. One such technique is breakpoint injection, in which a #BP instruction (e.g., INT3, instruction opcode 0xCC for x86 or 0xE1600070 for ARM) is written into the VM's memory at code locations deemed of interest. However, the trade-off is that, unlike SLAT permissions, the breakpoints are now visible to the domU. This means that any malicious process can detect that the malicious process is being monitored and thus alter its behavior to remain hidden. Thus, to hide the presence of the breakpoints from the domU, these pages need to be further protected by restricting the pages to be executed only in the SLAT. This permits the removal of breakpoints before in-domU code-integrity checking mechanisms (e.g., Windows Patchguard) can access the page. Thus, at least one embodiment of the disclosure configures the CPU to issue a VMEXIT when breakpoints are executed and configures Xen to forward such events to the control domain. This results in trapping the execution of any code within the analysis VM. The #BP injection technique therefore allows deep and accurate insight into both kernel and user-land code execution.

Turning now to FIG. 8, a small portion of the raw output from VMI for a single execution trace 800 is shown. This raw output shows extensive information that can be used for, e.g., linguistic analysis and malicious intent. The trace for fopen shows function calls 802, 804, 806, 808, 810, 812, 814 (in bold), input parameters, and return values. It should be appreciated that all of the execution traces for all of the different paths through a program must be collected together before they can be associated with similar labeled knowledge graph entries.

Word Vector Learning

The amount of details contained in the execution traces are then tuned for performance and accuracy. For instance, important terms, such as function names and resources, must be preserved, while superfluous terms and irrelevant details (e.g. loops, unused parameters, etc.) can be removed to minimize the number of tokens that appear in the traces. Trace abstraction can further prune and simplify traces without removing essential or important terms. One difference between learning from programs and learning from natural language is the size of the vocabulary in each domain. In natural language, vocabulary size is bounded (e.g., by the words in a dictionary, ignoring issues like misspellings). In programs, the vocabulary is essentially unlimited: Due to identifier names, there are a huge number of distinct words that can occur in a program.

Abstractions fall into a few simple categories and the owner of the process of the trace and events that occur can be used to further distill information. The status of the current trace provides contextual information that can modify the meaning of an event and provide data about the returned result, if any. The flow of data in the trace can also be abstracted to encode relevant contextual information. Taken together, an abstracted trace contains a rich summary of a program's actions. FIG. 9 shows an example trace abstraction 900 of the trace 800 from FIG. 8. This abstraction can prune unnecessary information while keeping important terms.

Similarities Between Trace Fragments and Textual Descriptions

In at least one embodiment of the disclosure, an analysis system is disclosed that compares textual descriptions of software behavior in English to dynamic program traces. Intuitively, the data collection phase identifies pairs of textual descriptions and code. The code examples are then compiled and executed to generate dynamic traces producing "anchor points" between the space of dynamic program traces and the domain-specific English natural language model.

Figure 10:
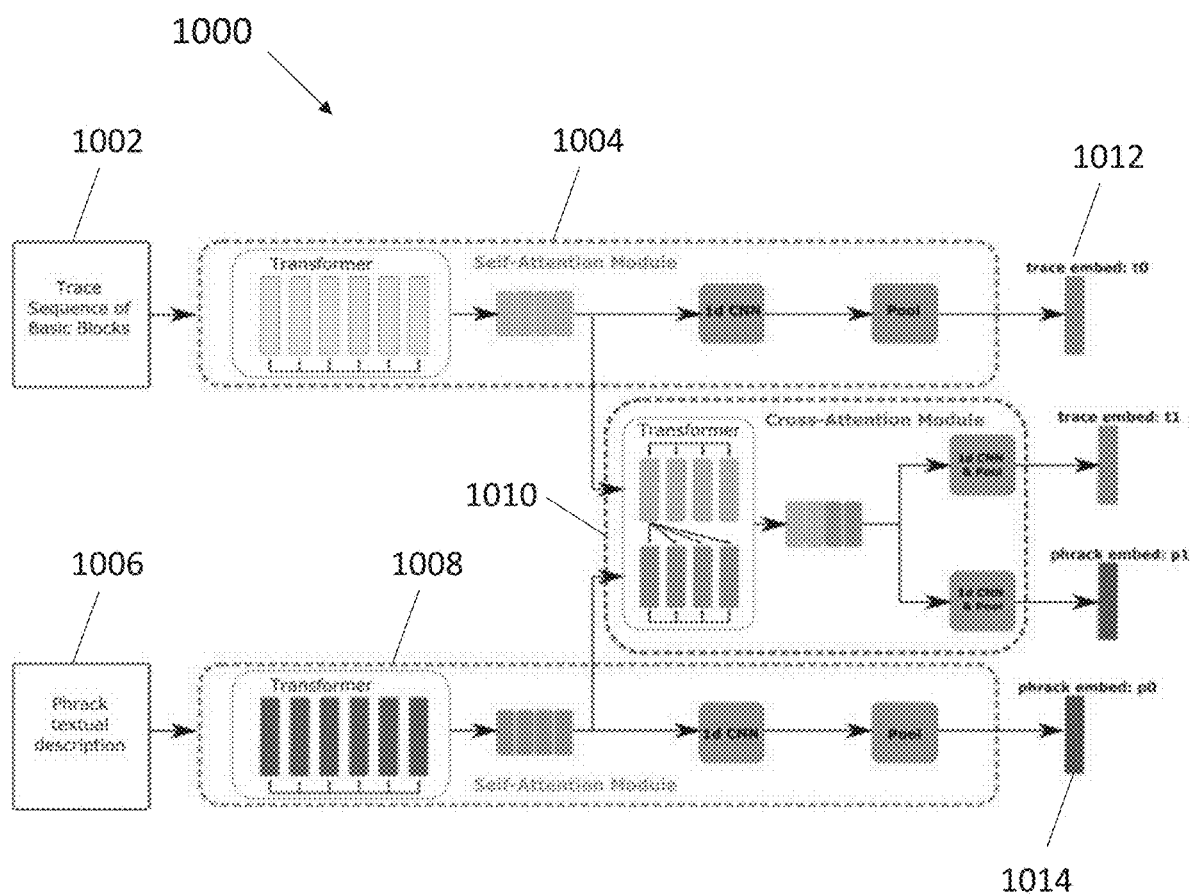
FIG. 10 is a diagram of a system that links trace fragments and textual descriptions, and labels similar traces according to at least one embodiment of the present disclosure.

To compute the similarity between the two different representations, the pre-trained transformer model (e.g., TraceBERT) computes, for a given sequence of basic blocks, a contextually dependent vector representation of each basic block (e.g., a linear group of instructions ending in a jump) in the sequence. The diagram in FIG. 10 shows a system 1000 that links trace fragments and textual descriptions, and labels similar traces. The trace fragment 1002 of basic blocks is input into a self-attention module 1004, which can comprise a transformer. Similarly, a textual description 1006 is input into a self-attention module 1008, which can also comprise a transformer. A cross-attention module is shown at 1010.

Further, the vector representation 1012 of a trace fragment is denoted to, which is a vector combination (e.g., computed by a one-dimensional convolutional network) of the vectors for the basic blocks in the trace fragment 1002. Analogous to natural language models, each basic block corresponds to a word, each function collects related basic blocks to express an overall thought, and a trace is a sequence of basic blocks analogous to a document.

Likewise, the self-attention module 1008, which may comprise a domain-adapted transformer model (e.g., PhrackBERT), produces contextual vector representations for each word of a given textual description 1006. The contextual word vectors are combined together by a one-dimensional convolutional network into a representation $p_0$, shown at 1014. Transformer models, such as PhrackBERT, can utilize banks of self-attention mechanisms that learn, during the pre-training phase, different weights to apply to words in a fragment to determine the "appropriate" context.

The cross-attention module 1010 models the context between the two different modalities, that is, the trace fragments 1002 and the textual descriptions 1006. For further information on cross-attention mechanisms, see X. Wei, et al., "Multi-Modality Cross Attention Network for Image and Sentence Matching," 2020 IEEE/CVF Conference on Computer Vision and Pattern Recognition (CVPR) (Seattle, Washington): 10938-47. The module 1010 can comprise a model that is trained on a dataset of trace/text pairs to earn attention weights between basic blocks and the vocabulary of PhrackBERT. The cross-attention mechanism "aligns" the representations from PhrackBERT and TraceBERT to produce a similarity score between the different modalities. This allows linking of textual descriptions of important concepts and the machine instructions that implement them, which is then used to identify previously unknown or unseen novel sequences of machine instructions.

Explaining Unknown and/or Unlabeled Clusters Using Generative Grammar

Generally, malicious actions can comprise smaller individual instructions and functions which, in and of themselves, are not malevolent. However, when benign individual actions are combined in certain specific ways, they can create unwanted behaviors. In this way, the infinite combination of instructions leads to an infinite number of possible malicious actions, which would be infeasible to fingerprint via signatures. However, by identifying the ways in which specific critical actions (which can be extracted from execution traces and contained in the knowledge graph) can be combined, previously novel and unknown malicious actions can be identified and classified.

At least one embodiment of the disclosure uses an approach for program understanding that assumes previously unknown concepts can be constructed and described using a hierarchical combination of primitive components contained in the knowledge graph. For more on primitive components, see, e.g., B. Lake, "Human-level concept learning through probabilistic program induction," *Science* 350.6266:1332-1338 (2015). These primitive components can be connected to other primitives to form more complex, higher order representations based on rules that dictate how they can connect and assemble. The primitive components can be something as simple as a single computer instruction or something as complex as a function or even an entire program. Unknown conceptual representations and clusters can be explained compositionally from pieces of related concepts, where the pieces reflect structure in the underlying causal process that provides category examples.

Figure 11:
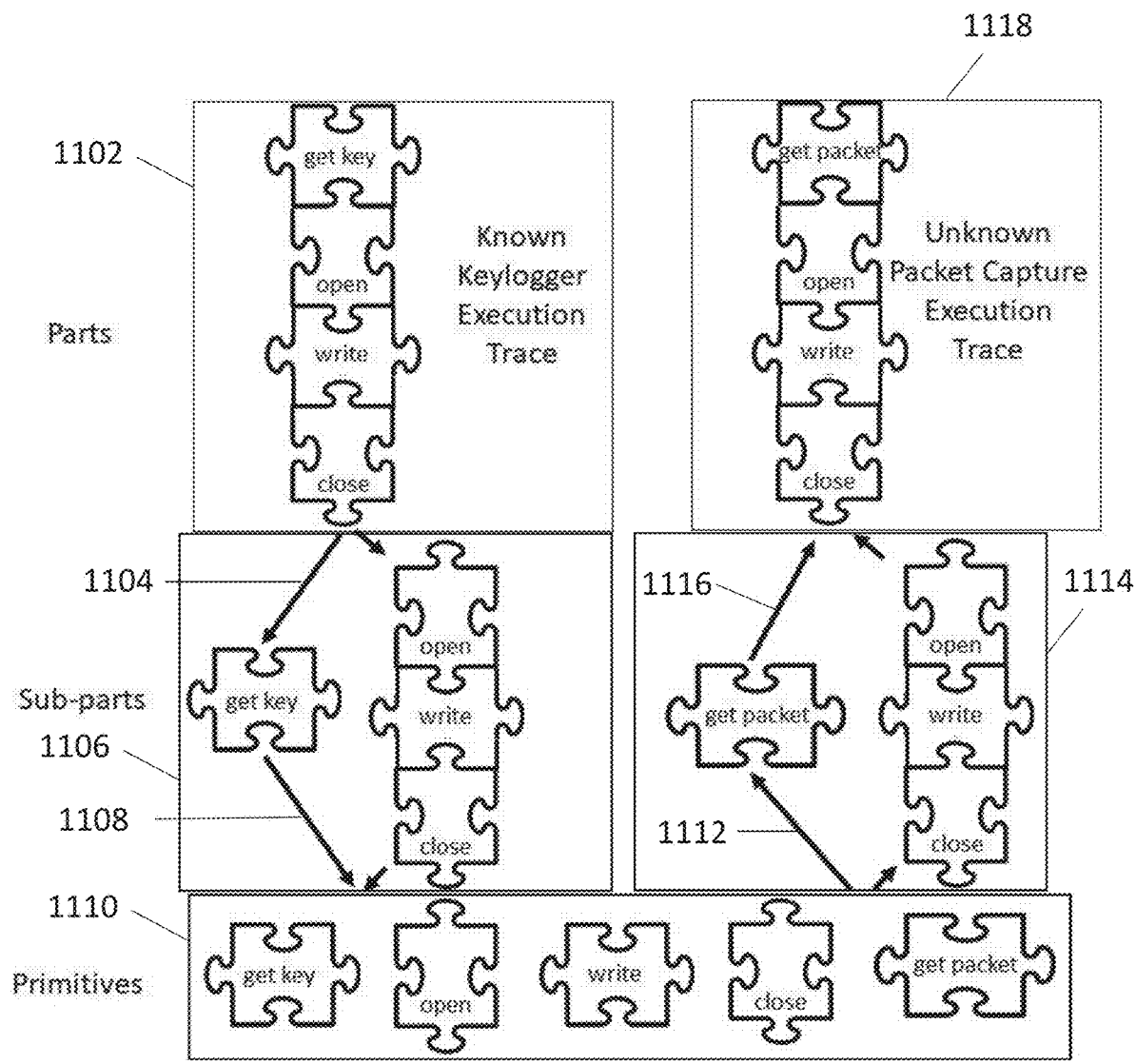
FIG. 11 shows a method for understanding novel malicious concepts according to at least one embodiment of the present disclosure.

By using the principles of compositionality and causality to identify simple actions that can be decomposed from malware examples, it is possible to define a generative process for understanding novel malicious concepts, as shown in FIG. 11. High-level malicious concepts such as the keylogger trace 1102 are deconstructed at step 1104 into a hierarchical combination of sub-parts 1106. These sub-parts are then further deconstructed at step 1108 into primitives 1110. These primitives can be stored in a knowledge graph and then used to explain other previously unknown malicious actions, such as an unknown packet capture trace 1118. This is done by reconstructing the primitives, at step 1112, into sub-parts 1114, which are then further used at step 1116 to identify the unknown packet capture trace 1118.

In at least one embodiment, concepts in the knowledge graph can be as simple as a single action (e.g. open file) or a sequence or combination of multiple sub-concepts (e.g. open file, write data, close file) and the dynamic execution traces that provide the concrete machine instructions that implement them. Each concept also contains the rules on how it can be combined with other concepts (e.g. the return value of the get key press function must be passed as an input parameter of a write function). The process for understanding a new "type" of malware is performed using the cross-attention mechanism described previously herein. When an unknown execution trace is analyzed, its constituent parts are identified by matching them to concepts that are stored in the knowledge graph and their execution traces. If the constituent parts combine in similar ways as an existing malicious concept by performing similar actions (e.g., based on clusters that are nearest neighbors), the unknown executable is clustered with the root concept and labeled as such. Concepts can be combined or deconstructed combinatorically across multiple levels, including sub-parts and parts, to identify novel, complex actions never seen before.

Web Services Implementation for High-Throughput Processing

Previously described herein are embodiments of a system that uses anthronoetic linguistic analysis techniques to discover well-known and novel malicious behaviors in unknown program executables, macros, and scripts. Such a standalone system is useful for specific applications. Additionally, cloud computing can be used to scale the system for other applications.

It should be appreciated that cloud computing web services can provide a set of primitive abstract technical infrastructure and distributed computing building blocks and tools. Examples of such cloud computing services are known and can include tools and building blocks such as, for instance, an Elastic Container Service (ECS), a Machine Learning Service (MLS), and a Simple Storage Service (SSS). Each of these will be described in further detail below.

Elastic Container Service (ECS)

An ECS can provide an interface to launch and stop container-based applications with simple application programming interface (API) calls. An ECS can also provide information on the state of the cluster from a centralized service. It is possible to schedule the placement of containers across a cluster based on resource needs, isolation policies, and availability requirements. An ECS can therefore be used to create a consistent deployment and build experience, manage and scale batch and Extract-Transform-Load (ETL) workloads, and build sophisticated application architectures on a microservices model.

In at least one embodiment of the disclosure, Xen, along with DomU (guest) operating systems of Windows and Linux variants can be containerized on an ECS Bare Metal Instance (capable of hosting a hypervisor such as Xen) for the path exploration, forced execution, and trace collection components. These traces along with the knowledge graph will feed into the MLS for analysis and reasoning.

Machine Learning Service (MLS)

An MLS permits quick and easy building and training of machine learning models, and further enables deploying such models into a production-ready hosted environment. An MLS can also provide an authoring notebook instance for easy access to data sources for exploration and analysis so that servers need not be managed. An MLS can further provide common machine learning algorithms that are optimized to run efficiently against extremely large data in a distributed environment.

The entry point to an MLS can be a user interface (UI) that is used to configure various hyperparameters or variables that control the machine learning process. The main purpose of the UI is to get user input for the hyperparameters, parse it in a payload, and start the automated machine learning process by calling a remote endpoint.

When such a remote endpoint is called, a managed service can proxy the request to other web services that can execute code and/or algorithms. The endpoint can therefore be thought of as a telephone number, and the managed service as a receptionist that can securely direct the caller to the appropriate services. During this process, the cloud computing web service can provide ways for a user to monitor performance metrics, reduce data latency, and control access to the endpoint.

Once the managed service processes the request, the managed service can trigger a Lambda function that executes code responsible for managing the pipeline. Lambda functions are stateless, meaning that they do not keep information about any previous state. During initialization, the managed service temporarily saves the hyperparameters to the environmental variables in a monitoring service. When the Lambda function gets called, the monitoring service provides the Lambda function with information about the current step of the pipeline and what code to execute next, as well as the appropriate hyperparameters for that step.

Simple Storage Service (SSS)

A SSS is Internet storage that can store and retrieve any amount of data at any time, from anywhere on the web. A SSS can store data as objects within buckets. An object generally consists of a file and, optionally, any metadata that describes that file. To store an object in an SSS, the file is uploaded to a bucket. Upon upload, permissions can be set on the object and any metadata. Buckets are the containers for the objects. Multiple buckets are allowed, and each bucket has individual access control that dictates who can create, delete, and list objects in the bucket, view access logs for the bucket and its objects, and the geographical region where the SSS will store the bucket and its contents. A SSS will also generally contain the generated execution traces as well as the knowledge graph.

Computation

When a computation is required, the MLS spawns a bare metal Docker container that runs the appropriate algorithm for the specific task. It interacts with the SSS to provide the Docker container with the ability to grab datasets and store artifacts from/to a shared repository.

Figure 12:
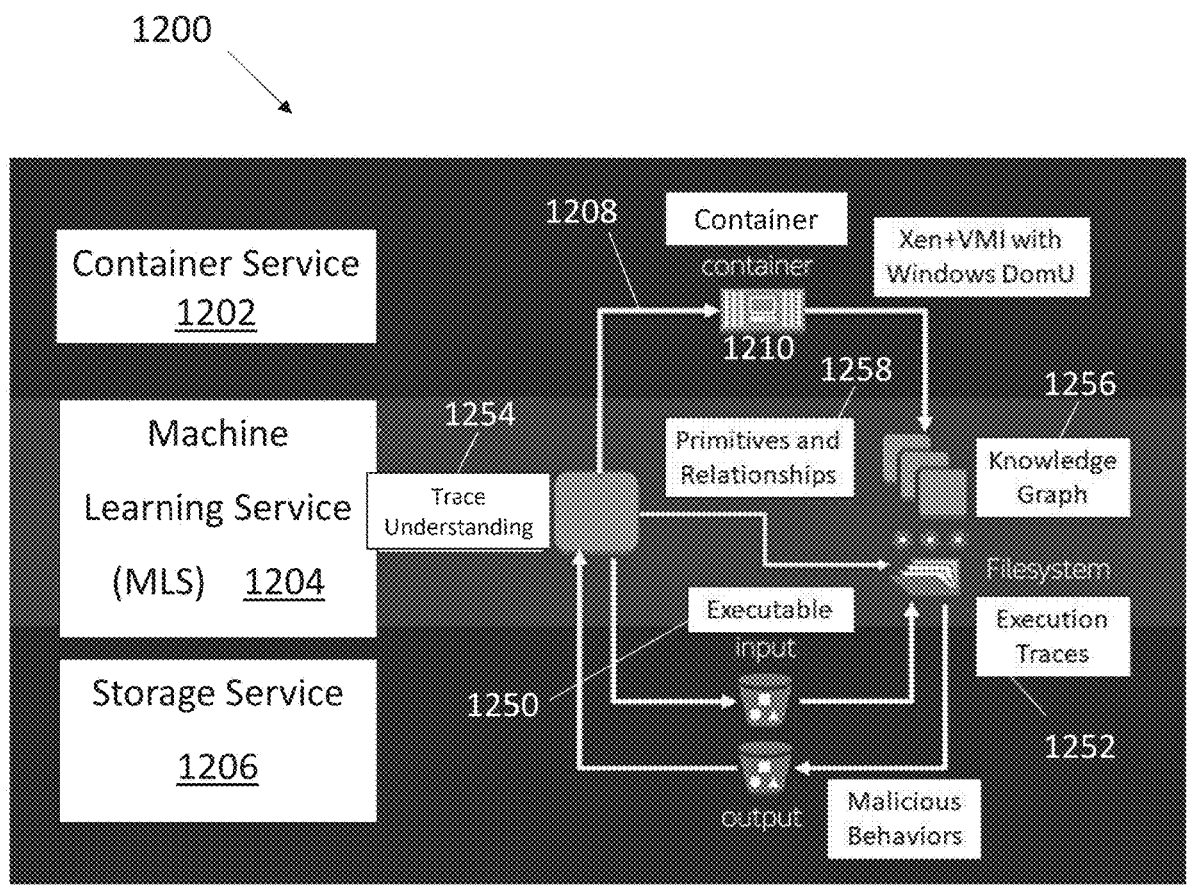
FIG. 12 displays a workflow of a method of understanding malicious actions on a generic cloud computing web service according to at least one embodiment of the present disclosure.

FIG. 12 shows a workflow of at least one embodiment of the disclosure on a generic cloud computing web service 1200. This web service contains a container service 1202 upon which virtual machines can run, a machine learning service (MLS) 1204 that can run large machine learning algorithms, and a storage service 1206 that can host databases and files for the machine learning service. The process starts with an executable 1250 as an input, which has execution traces 1252. The executable is then executed (e.g., under forced execution) in a container 1210, such as Xen with VMI, and analyzed with the machine learning service 1204. The MLS spins up a cluster of one or more compute instances, as specified by the requirements, to analyze and understand the traces at block 1254. This can be done with the use of the knowledge graph 1256, which contains the primitive actions of a program, some of which may be malicious, along with their relationships 1258. After the computation is completed, the output is written to a bucket, from where it can be retrieved for further analysis in the notebook. All steps are orchestrated from the MLS notebook instance.

In summary, embodiments of the disclosure described herein provide the ability to understand and classify novel malicious behaviors and/or malicious processes. Such embodiments additionally provide explanations for the classification results. These embodiments are therefore an improvement upon currently-existing methods and systems that cannot identify new or novel malicious processes and/or do not explain classification results.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A system comprising:
a memory storing computer-readable instructions; and
at least one processor to execute the computer-readable instructions to:
generate a malware knowledge graph by:
collecting source material of malicious actions that can be implemented by one or more pieces of malware, the source material comprising textual descriptions of the malicious actions and code samples containing the malicious actions,
extracting, from the source material, textual explanations to define malicious concepts,
embedding the malicious concepts into a real-valued vector space,
performing dimensional reduction,
clustering the malicious concepts, and
labeling the malicious concepts,
wherein the malware knowledge graph links the malicious concepts to code execution traces obtained from the code samples;
compile the code samples to generate compiled code samples;
construct a first model using the textual explanations and dynamic traces generated from the compiled code samples;
match, by a cross-attention network, the textual explanations to the dynamic traces to describe the dynamic traces with the textual explanations;
construct a second model using the malicious concepts and a subset of the dynamic traces that are associated with the malicious concepts, the subset of the dynamic traces being displayed on the malware knowledge graph; and
match malicious behavior in a segment of computer code to the malicious concepts to classify the malicious behavior,
wherein the first model comprises a joint multi-modal model,
wherein the second model comprises a generative model, and
wherein the extracting the textual explanations further comprises:
separating the source material into a plurality of sentences,
parsing each sentence in the plurality of sentences to identify a plurality of different parts of speech, and
decomposing the plurality of different parts of speech into subject-verb-object triples.

2. The system of claim 1, wherein the cross-attention network is configured to label the dynamic traces.

3. The system of claim 1, the at least one processor further to:
identify unknown malicious actions in the segment of computer code, wherein the unknown malicious actions comprise at least one of: hidden malicious actions and novel malicious actions.

4. The system of claim 1, the at least one processor further to:
forcibly execute one or more portions of the segment of computer code;
execute a path exploration feedback loop to uncover the hidden malicious actions;
obtain execution traces for the hidden malicious actions;
embed the execution traces into a vector space to generate embedded execution traces;
cluster the embedded execution traces to define known clusters and unknown clusters;
label the known clusters with a first set of text labels; and
construct a second set of text labels for the unknown clusters to identify and explain the unknown clusters.

5. The system of claim 4, wherein the forcibly execute further comprises mutating control flow.

6. The system of claim 5, wherein the mutating control flow further comprises controlling one or more branches of the one or more portions of the segment of computer code.

7. The system of claim 4, wherein the execution traces contain information regarding system calls, system files, network resources, and libraries used.

8. The system of claim 4, wherein the cluster is performed using a domain-adapted model that produces contextual vector representations for each word in the textual descriptions.

9. The system of claim 4, wherein the first set of text labels comprises the malicious concepts in the malware knowledge graph, and wherein the label comprises using the cross-attention network.

10. A system comprising:
a memory storing computer-readable instructions; and
at least one processor to execute the computer-readable instructions to:
obtain source material containing sample source code and natural language text descriptions of the sample source code,
generate a malware knowledge graph that links malicious concepts to code execution traces obtained from the sample source code, the generating comprising:
extracting, from the source material, one or more textual phrases by parsing the source material to identify keywords,
linking the one or more textual phrases to one or more sets of software code to define the malicious concepts,
mathematically embedding the malicious concepts into a continuous vector space,
performing dimensional reduction,
clustering the malicious concepts into one or more groups,
labeling the one or more groups,
generate dynamic traces from compiled versions of the sample source code,
construct a first model using the one or more textual phrases and the dynamic traces,
match, by a cross-attention network, the one or more textual phrases to the dynamic traces to describe the one or more textual phrases with the dynamic traces,
construct a second model using the malicious concepts and a subset of the dynamic traces that are associated with the malicious concepts, and
identify one or more portions of a segment of computer code that contain the malicious concepts, thereby classifying malicious behavior,
wherein the source material comprises one or more articles on malware, and
wherein the dimensional reduction is a non-linear dimensional reduction.

11. The system of claim 10, wherein the malware knowledge graph is a hypergraph comprising a plurality of nodes and a plurality of hyperedges, and wherein the plurality of hyperedges are a plurality of generalized edges that can connect any number of nodes in the plurality of nodes.

12. The system of claim 10, the at least one processor further to:
identify hidden malicious behavior in the segment of computer code.

13. The system of claim 12, the at least one processor further to:
forcibly execute one or more portions of the segment of computer code;
execute a path exploration feedback loop to uncover hidden malicious actions;
obtain execution traces for the hidden malicious actions;
embed the execution traces into a vector space to generate embedded execution traces;
cluster the embedded execution traces, thereby defining known and unknown clusters;
label the known clusters; and
construct textual labels for the unknown clusters, thereby identifying and explaining the hidden malicious behavior.

14. The system of claim 13, wherein the execution traces comprise information regarding at least one of system calls, files, network resources, and libraries used.

15. A method for classifying malicious behavior in a segment of computer code, the method comprising:
generating, by at least one processor, a malware knowledge graph linking examples of malicious actions to code execution traces, the code execution traces obtained from code samples;
compiling, by the at least one processor, the code samples to generate compiled code samples;
generating, by the at least one processor, dynamic traces from the compiled code samples;
displaying, by the at least one processor, a subset of the dynamic traces on the malware knowledge graph, the subset being associated with the examples of malicious actions;
constructing, by the at least one processor, a first model using dynamic traces generated from the compiled code samples;
constructing, by the at least one processor, a second model using the examples of malicious actions and the subset of the dynamic traces;
matching, by the at least one processor, malicious behavior in a segment of computer code to the examples of malicious actions to classify the malicious behavior;
executing, by the at least one processor, a feedback loop to uncover hidden malicious actions in the segment of computer code;
embedding, by the at least one processor, execution traces for the hidden malicious actions into a vector space to generate embedded execution traces; and
clustering, by the at least one processor, the embedded execution traces to generate clusters of embedded execution traces,
wherein the clustering the embedded execution traces further comprises:
performing, by a data clustering algorithm, hierarchical density-based spatial clustering by grouping together points that are packed together, and
wherein the data clustering algorithm has a selectable parameter for minimum cluster size.

16. The method of claim 15, wherein the malware knowledge graph comprises a plurality of nodes and a plurality of edges, and wherein the plurality of edges connect any number of nodes in the plurality of nodes.

17. The method of claim 15, further comprising:
identifying, by the at least one processor, the malicious behavior using the second model.

18. The method of claim 15, further comprising:
forcibly executing, by the at least one processor, one or more portions of the segment of computer cod.

19. The method of claim 15, further comprising:
displaying, by the at least one processor, the clusters of embedded execution traces;
labeling, by the at least one processor, a first subset of the clusters of embedded execution traces that comprise known clusters; and
constructing, by the at least one processor, labels for a second subset of the clusters of embedded execution traces that comprise unknown clusters.

* * * * *